United States Patent

Livernash et al.

[11] Patent Number: 5,848,610
[45] Date of Patent: Dec. 15, 1998

[54] MOTORIZED DIVERTER VALVE

[76] Inventors: Robert A. Livernash, 730 S. Loomis St., Naperville, Ill. 60540; Robert J. Cooper, 304 S. 3rd St., West Dundee, Ill. 60118; Manuel Gamez, 3719 W. Irving Park Rd., Chicago, Ill. 60618

[21] Appl. No.: 751,011

[22] Filed: Nov. 14, 1996

[51] Int. Cl.$^6$ .................................................. E03B 31/00
[52] U.S. Cl. .............................. 137/625.11; 137/625.46; 251/129.12
[58] Field of Search ......................... 137/625.11, 625.46; 251/129.12

[56] References Cited

U.S. PATENT DOCUMENTS

| | | | |
|---|---|---|---|
| 3,757,583 | 9/1973 | Ludewig, Jr. ...................... | 137/625.11 |
| 3,802,782 | 4/1974 | Natelson ............................ | 137/625.11 |
| 4,195,665 | 4/1980 | Nolan et al. ....................... | 137/625.11 |
| 4,310,022 | 1/1982 | Cohen ................................ | 137/625.46 |
| 4,326,604 | 4/1982 | Sotiropoulos ..................... | 137/625.11 |
| 4,604,093 | 8/1986 | Brown et al. ..................... | 137/625.11 |
| 4,632,148 | 12/1986 | Stark, Sr, et al. ................. | 137/625.46 |

Primary Examiner—Denise L. Ferensic
Assistant Examiner—John Ball
Attorney, Agent, or Firm—Jules Jay Morris; Terrence Martin; Sean Detweiler

[57] ABSTRACT

A diverter valve for diverting fluid flow between an inlet and an outlet selected from among several outlets is disclosed. The diverter valve disclosed is useful for distributing fluids in laundry applications, especially automatic clothes washers and the like. It includes a body, a valve member, a motor to operate the valve, an actuable switch, a cam mechanism to de-energize the motor upon movement to a position, and a housing for the device.

17 Claims, 4 Drawing Sheets

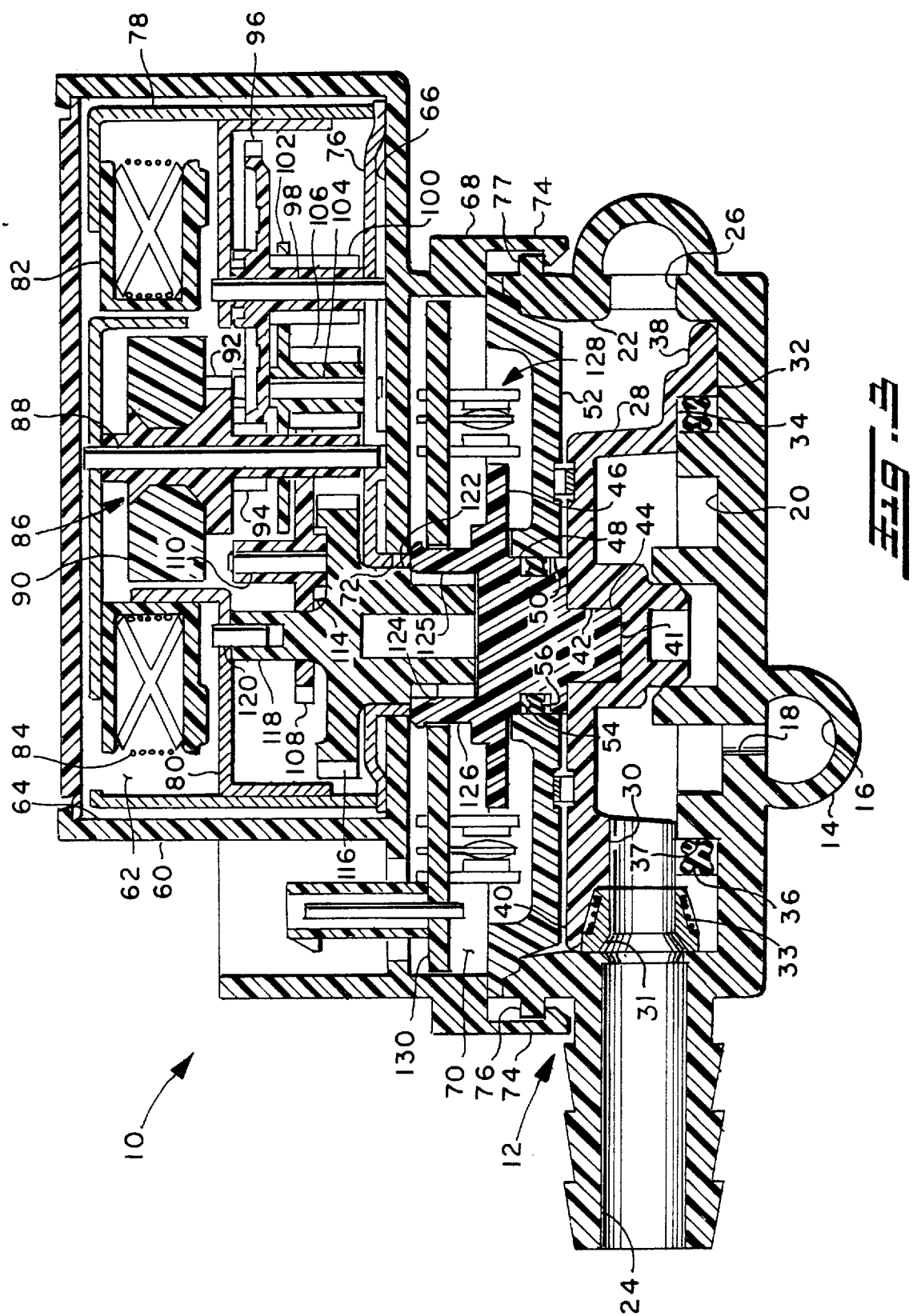

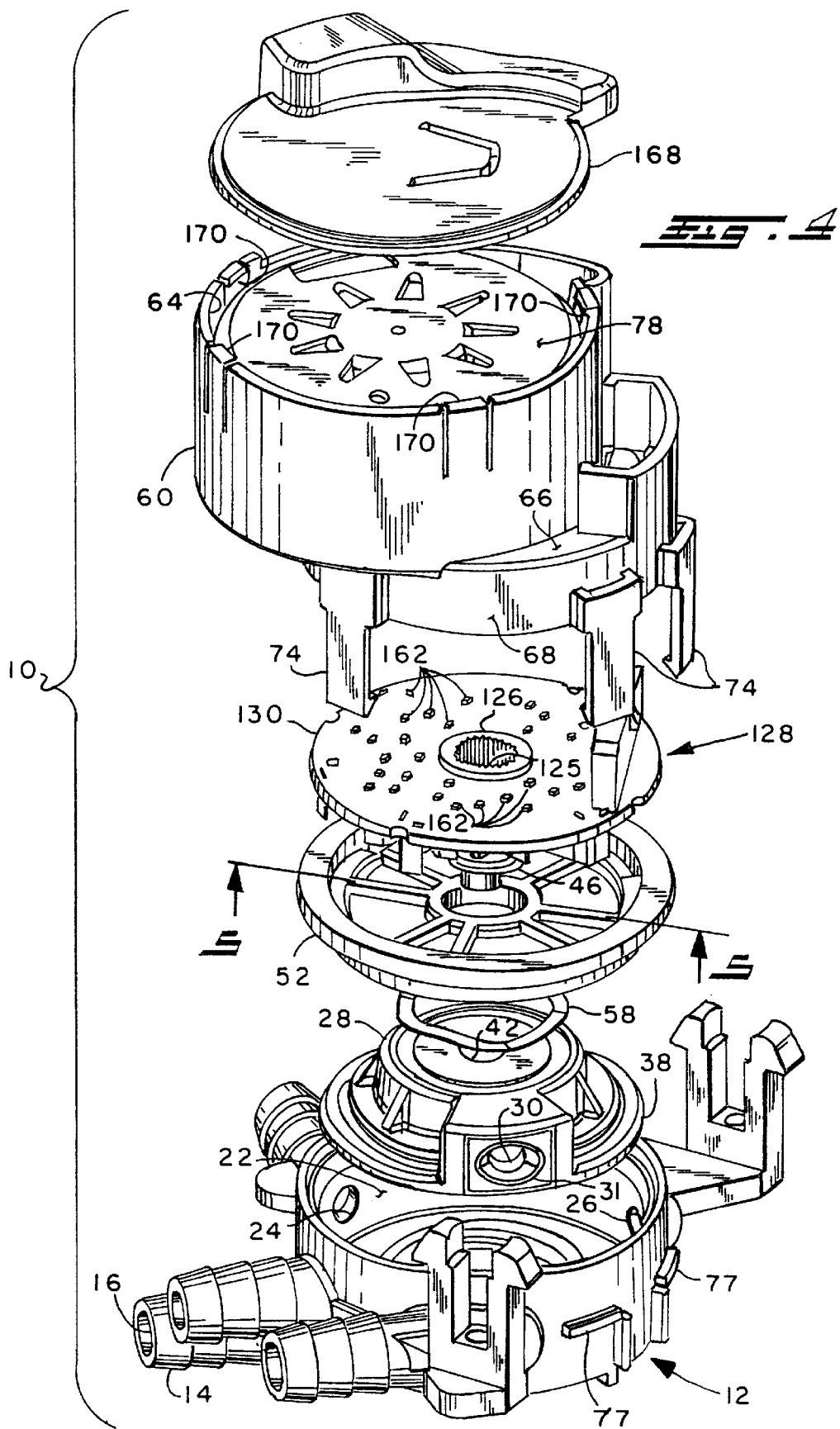

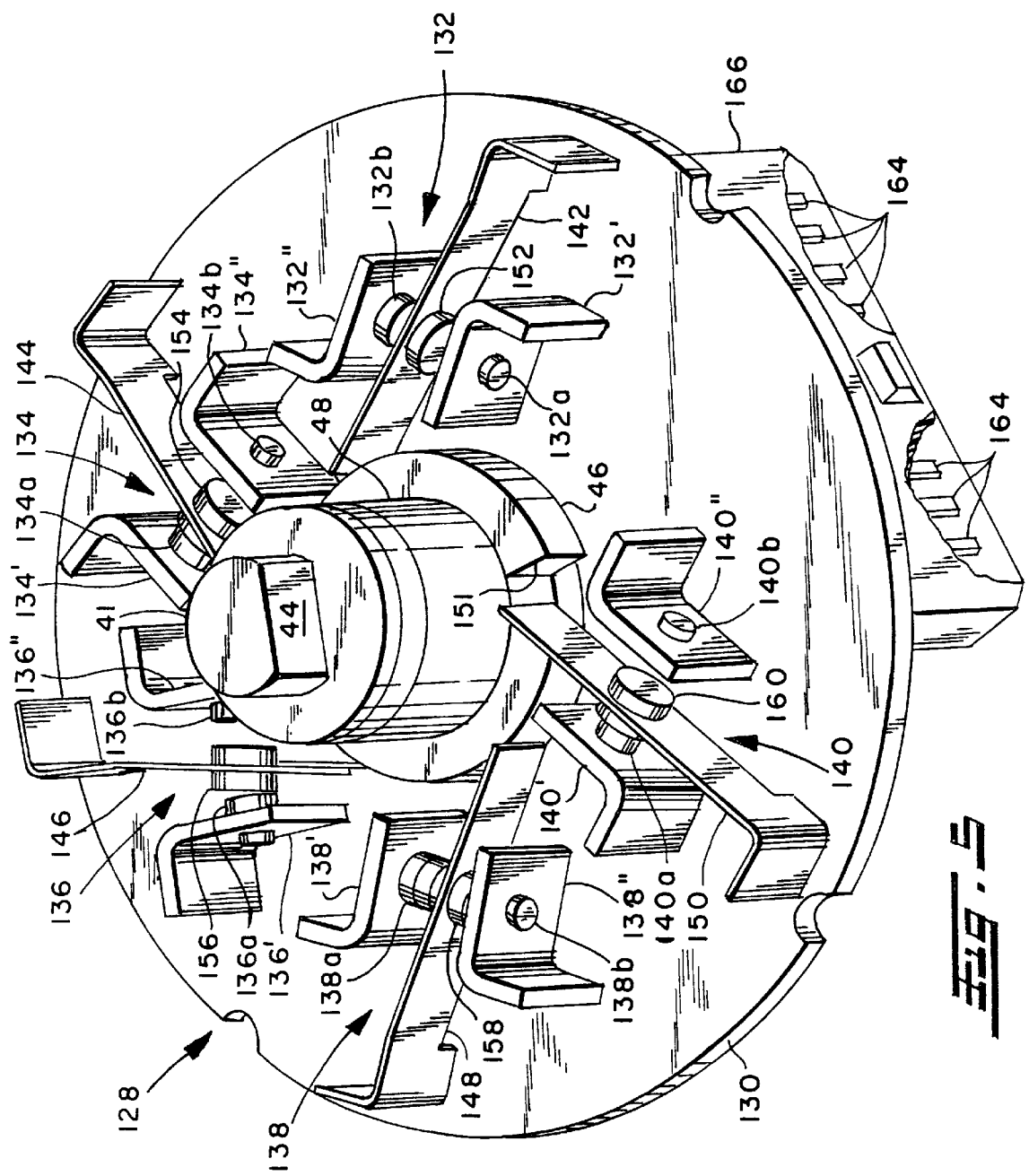

MOTORIZED DIVERTER VALVE

BACKGROUND OF THE INVENTION

The present invention relates to diverter valves for diverting flow from an inlet to a selected one of plural outlets. The invention particularly relates to such valves having application in laundry appliances for distributing water to various locations in an automatic clothes washer for dispensing detergent, fabric softener, bleach or other laundry additives.

In the competitive marketplace for automatic clothes washers and dishwashers for household use, it has been desired to provide complete electrical/electronic control of the appliance program and to provide user selection of various programs which are then capable of being fully implemented automatically by the machine programmer controller. Where it has been desired to provide the user with a selection of types of additives or the sequence in which certain additives and functions are performed, it has been desired to provide for performing the selection of these programs automatically by servoactuators rather than requiring the user to individually position a control to perform the function during the machine cycle.

Where it has been desired to provide for automatic dispensing of plural additives in a laundry appliance, the need has arisen for a servo actuated valve for diverting water flow to the various additive containment containers at the appropriate time during the appliance program for dispensing the desired additive. Thus, it has been desired to provide a low cost reliable way or means of electrically dispensing additives in a laundry appliance during the appliance program cycle in a manner which is low in manufacturing cost and simple to install during manufacture of the appliance and is reliable during the service life of the appliance.

BRIEF SUMMARY OF THE INVENTION

It is an object of the present invention to provide a motor driven diverter valve which is low in cost, simple to construct and easy to install for use in an automatically programmed appliance.

It is a further object of the present invention to provide a low cost diverter valve suitable for use in household laundry appliances and which provides for accurate positioning of a valve member for directing flow to a selected one of plural outlets in response to a relatively low power control signal.

The present invention provides a diverter valve utilizing a low cost synchronous timing motor driving a rotary diverter valve through a speed reducing unit which is compactly assembled on the valve body.

The present invention employs a low power requirement synchronous timing motor driving a rotary cam member through a speed reducer which is disposed within the motor housing. The housing includes a circuit board having plural cam actuated switches disposed thereabout. The cam is journalled on a cover for the rotary valve member which is disposed in a valving chamber in the valve body for directing flow from the single inlet to a selected one of plural outlets. The motor and speed reducer with the switchboard and cam are assembled as a subassembly and the valve body, valve member and cover and cam are assembled as another subassembly; and, the motor/speed reducer subassembly is then attached to the valve body subassembly. Upon energization the motor drives the valve member to the selected position and the cam actuates a switch to disconnect power from the motor once the valve is in the desired position.

BRIEF DESCRIPTION OF THE DRAWINGS

FIG. 3 is a composite cross-section with features related to the picture plans for purposes of illustration;

FIG. 4 is an exploded view of the valve assembly of FIG. 1;

FIG. 5 is an axonometric view of the underside of the circuit board of FIG. 4 taken in the direction of the view indicating arrows 5—5 of FIG. 4.

DETAILED DESCRIPTION OF THE INVENTION

Figure 1:
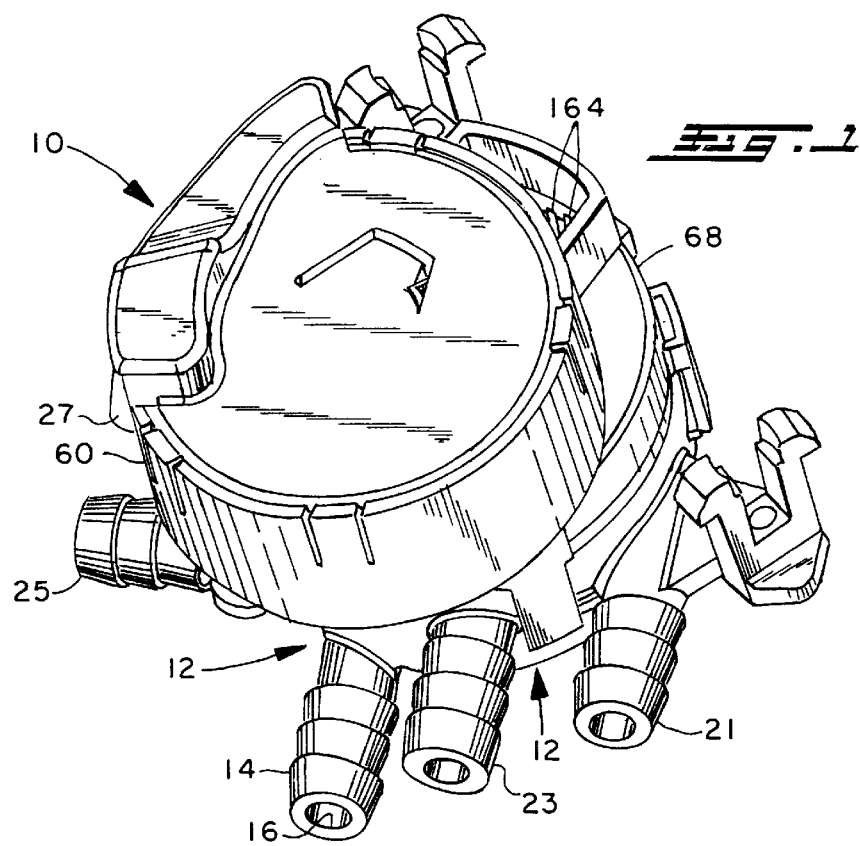
FIG. 1 is an axonometric view of the assembled valve of the present invention.
Figure 2:
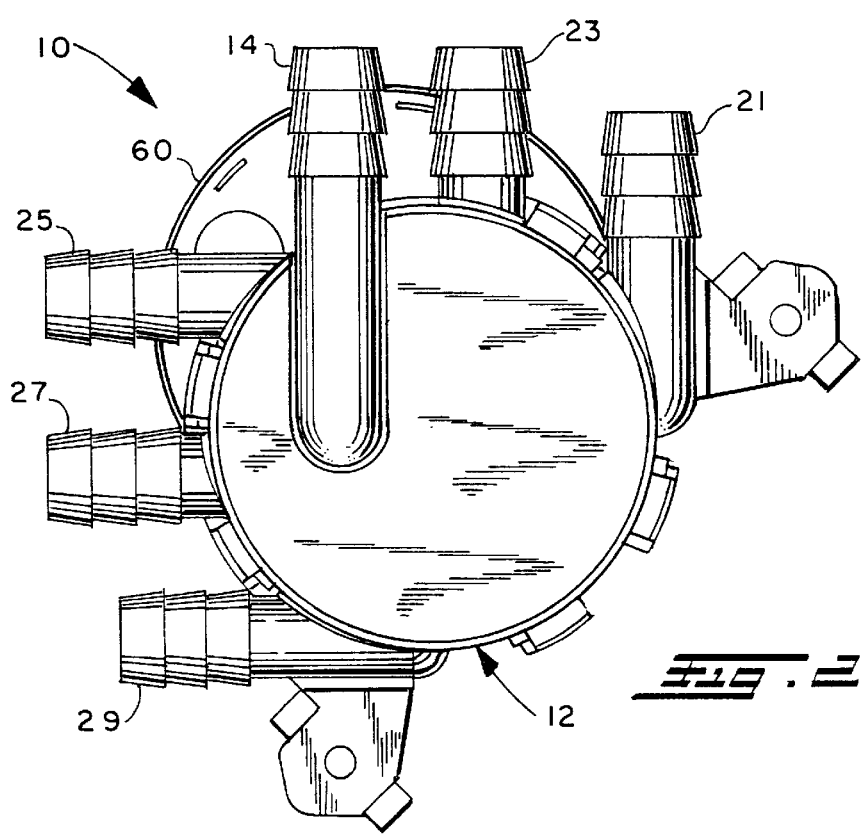
FIG. 2 is a bottom view of the assembly of FIG. 1.

Referring to FIGS. 1 through 3, the motorized diverter valve assembly of the present invention is indicated generally at 10 and includes a body indicated generally at 12 which has an inlet fitting 14 which has an inlet passage 16 therein which communicates with an inlet port 18 formed in a valving chamber 20 formed in the body. The valving chamber has a sidewall portion which, in the presently preferred practice of the invention has a cylindrical configuration denoted by reference numeral 22 and which has a plurality of outlet ports disposed therein in circumferentially spaced arrangement, which are illustrated in FIG. 3 and denoted by reference numerals 24, 26. In the embodiment illustrated in FIGS. 1 and 2, five outlet fittings are employed as denoted by reference numerals 21, 23, 25, 27, 29 and each has a passage such as 24, 26 therein which passage is ported to chamber wall 22 in circumferentially spaced arrangement. A rotary valving member 28 has a generally inverted cup-shaped configuration with the radially extending outlet port 30 formed therein which communicates with a selected one of the outlet ports by rotation of the valve member 28 to a selected discrete rotational position as will hereinafter be described in greater detail.

The valve member 28 has the axial face 32 of the open rim thereof provided with a circumferential groove 34 therein in which is received a resilient annular seal member 36 for effecting a rotary seal of the valve member against a cylindrical rib 37 formed in the valving chamber 20. The surface of the outlet port 30 of the valve member is configured in a cylindrical arc to interfit in closely fitting arrangement with the cylindrical wall 22 of the valving chamber; and, port 30 has a sealing member 31 for providing a moving seal with cylindrical wall 22 with the seal 31 ring biased against wall 22 by a spring 33. Thus, rotation of the valving member within chamber 20 is controlled by the registration of the periphery 38 of the valve member in closely interfitting sliding registration with the cylindrical wall 22 of the valving chamber 20. The outer peripheral face of port seal 31 is moved in rotary sliding engagement with the cylindrical wall 22 of the valving chamber to provide selected communication between inlet passage 16 and one of the outlet ports when the valve member is rotated such that the outlet port 30 thereon is disposed to align with one of the outlet ports.

The upper surface 40 of the valve member has a cylindrical recess 42 formed therein into which is 41 received in driving engagement a stub shaft with a flat portion 44 of a rotary cam member 46. Cam member 46 has an enlarged diameter portion 48 of stub shaft 41 journalled in a bore 50 formed in a cover 52 provided over the cylindrical wall 22 of the valving chamber 20. The enlarged diameter 48 of the stub shaft 41 has a circumferential groove 56 formed therein which has a resilient annular seal 54 received therein for providing a rotary seal between the surface 48 and the bore 50.

A wave spring 58 is provided between the undersurface of cover 52 and the upper surface 40 of the valve member to bias the valve member against the chamber 20 and to maintain effectiveness of the annular seal 36 between the valve member 28 and the valve chamber 20.

Referring particularly to FIGS. 3 and 4, a motor housing 60 has an upper chamber or open cavity 62 with a cylindrical wall 64 which is integrally formed with a deck 66 which has on the undersurface thereof a second cylindrical wall portion 68 which defines a downwardly facing open cavity 70. In the presently preferred practice cylindrical wall 68 is offset from the cylindrical wall 64 of the upper chamber to facilitate the motor drive as will hereinafter be described.

The deck 66 has formed therein an aperture 72 for permitting connection to cam 46. The cylindrical wall 68 of housing 60 has a plurality of downwardly extending projections formed integrally therewith comprising snap lock tabs denoted by reference numeral 74 and which serve to snap over and engage correspondingly located lugs 77 provided on the body 12.

The upper housing chamber 62 has received therein a suitable mounting structure comprising a support plate 76 and a motor frame 78 which has therein a secondary frame portion denoted by reference numeral 80 which is attached to frame 78.

Referring to FIG. 3, a motor coil bobbin 82 is received in the motor frame 78 and has wound thereon a plurality of turns of electrical conductor 84 to provide the motor field windings. A rotor indicated generally at 86 is journalled on a shaft or pin 88 which has its upper end mounted in the motor frame 78 upper surface and its lower end mounted in deck plate 76. The motor rotor 86 includes a permanently magnetized armature 90 which may be of ferrite powder filled resin material and is mounted on a rotor bushing 92 which has formed thereon a motor drive pinion 94.

Motor drive pinion 94 engages a first stage pinion gear 96 which is journalled on shaft or pin 98 which has its lower end mounted in deck plate 76 and its upper end in the secondary deck 80. The first stage gear 96 has provided on its hub a first stage pinion 100 which engages a second stage gear 102 which is journalled on a pin 104 having its upper end secured in motor deck 80 and its lower end attached to deck plate 76.

The second stage gear 102 has provided thereon a second stage pinion 106 which engages a third stage gear 108 journalled on a pin or shaft 110 secured in deck plate 76. Third stage gear 108 has provided thereon a third stage pinion, a portion of which is visible in FIG. 3 and denoted by reference numeral 114 and which engages an output gear 116. The output gear 116 is journalled at the upper end of its hub 118 by a pin 120 received in the motor frame portion 80; and, the lower end of gear 116 has a hub 122 which is journalled in a flange formed in the deck plate 76 which extends into aperture 72.

The hub 122 of the output gear 116 has at least one driving surface 124 formed thereon for engaging a corresponding surface 125 (see also FIG. 4) in the hub 126 of cam rotor 46. In the presently preferred practice of the invention, the driving engagement surface 124 comprises an external spline formed on hub 122 and an internal spline 125 formed in the hub 126 of cam rotor 46.

Referring to FIG. 5, a switch assembly indicated generally at 128 comprises a circuit board 130 which has a plurality of switches indicated generally at 132, 134, 136, 138, 140 and a plurality of connector terminals 164 which are interconnected to the switches by connector strips on the circuit board which are not visible in FIG. 5 as they are on the underside of the board with respect to FIG. 5.

Each of the switches 132 through 140 has a contact blade 142 through 150 respectively each of which has the end thereof disposed to follow cam 46 which has a notch 151 formed therein with the end of contact blade 150 shown dropped into the notch in FIG. 5. Each of the contact blades 142 through 150 has provided thereon a double sided electrical contact as denoted by reference numeral 152 through 160. Each of the switches 132 through 140, also has a pair of oppositely disposed side contact denoted respectively 132a, 132b, 134a, 134b, 136a, 136b, 138a, 138b, and 140a, 140b which are mounted respectively on brackets 132', 132", 134', 134", 136', 136", 138', 138" and 140', 140". Each of the brackets has a generally right angular configuration and is secured to the board 130 by tabs 162 provided thereon which extend through the board 130 and are soldered to the printed circuit on the underside thereof with respect to FIG. 5. Tabs 162 are not visible in FIG. 5, but are shown in FIG. 4. In similar fashion, each of the contact blades 142 through 150 has the end thereof formed to a generally right angle configuration with tabs 162 provided thereon which extend through the circuit board and are soldered to strips provided thereon on the underside with respect to FIG. 5. With reference to FIG. 4, various protruding portions of these tabs 162 are shown extending through the circuit board to the upper surface thereof in FIG. 4. These tabs denoted by reference numeral 162 in FIG. 4 are soldered to the desired interconnecting strips (not shown) provided on the upper surface of the board 130.

In operation the cam surface 46 is set to maintain each of the switches 132 through 150 such that the contact blades 142 through 160 respectively are moved to close one of the side contacts associated respectively therewith; and, the cam notch 151 permits the end of a contact blade, for example contact blade 150, to drop therein causing the closed side contact to become open and the open contact to become closed in the manner of a single pole double throw (SPDT) switch.

Referring to FIG. 5, the contact blade 150 has its end dropped into cam notch 151 such that contact is broken between contact 160 and side contact 140b; and, contact has been made between the moveable contact 160 and the side contact 140a. Each of the switches 132 through 150 is electrically connected such that when the cam notch 151 is positioned to cause the respective contact blade to move, thereby opening the normally closed set of contacts, current flow to the motor is stopped and rotation of the shaft 48 is stopped. The valve member 28 is thus positioned such that the outlet port 30 is aligned with one of the outlet ports 21–29 in the body corresponding to the desired valve function. An electronic controller (not shown) may be employed to bypass the open switch to the motor and restart the motor to cause rotation of the cam 46 to the next switch position, for example, to switch 132 and once again the motor current will be stopped when the end of the contact blade 142 drops into notch 151 thereby positioning the outlet port 30 on rotor 28 to a different one of the outlets 21 through 29. Each of the switches 132 through 140 is connected to appropriate ones of terminal pins 164 provided in a receptacle 166 mounted on the board 130, which pins are adapted for connection to an external wiring harness connector (not shown).

In manufacture, the switch and circuit board assembly 128 is assembled into the cavity 70 on the motor housing as a subassembly and has the cam 46 preassembled thereon such that the stub shaft 41 is received in the aperture 50 in cover 52 and extends downwardly therethrough to engage the drive surface 42 in the valve member 28.

The motor housing upper chamber 62 has a cover 168 received thereover and engaged therewith by any suitable expedient as for example snap locking into tabs 170 provided in the upper rim of cylindrical wall 64.

The present invention thus provides a compact easy to manufacture and assemble and relatively low cost motorized diverter valve which has particular suitability for use in household automatic washing machines.

Although the present invention has been described hereinabove with respect to the illustrated embodiments, it will be understood that the invention is capable of modification and variation and is limited only by the scope of the following claims.

We claim:

1. A motorized diverter valve assembly comprising:
   (a) a body defining an inlet and a plurality of outlets communicating with a valving chamber;
   (b) a valve member disposed in said valving chamber for rotary movement with respect to said body, said valve member moveable between a plurality of discrete positions and operable in each of said positions to effect fluid communication exclusively between said inlet and a different one of said outlets;
   (c) motor means associated with said body operable upon selective energization to effect movement of said valve to a selected one of said positions;
   (d) switch means associated with each of said outlets and operable upon connection to a source of power and upon rotation of said valve member to a desired one of said outlets by said motor means to energize and de-energize said motor means;
   (e) cam means operable upon movement of said valve member to one of said discrete positions to actuate said switch means and de-energize said motor means; and,
   (f) a removable housing attached to said body and including said motor means and switch means.

2. The valve assembly defined in claim 1, wherein said switch means for each of said outlets are mounted on a circuit board having connector terminal pins thereon, with said board received in said housing with said terminals extending outwardly thereof thereby forming a sub-assembly.

3. The valve assembly defined in claim 1, wherein said switch means are mounted on a circuit board having connector terminal pins thereon; and, said board is received in said housing and retained therein as a sub-assembly with said terminal pins extending through voids in said housing and outwardly therefrom.

4. The valve assembly defined in claim 1, wherein said valve member includes an outlet port having a resilient frusto-conical seal therein for sliding engagement individually with said plurality of outlets.

5. The valve assembly defined in claim 1, wherein said valve member, said body and said cam means comprise a sub-assembly.

6. The valve assembly defined in claim 1, wherein said valve member has a generally inverted cup-shaped configuration with a resilient annular seal disposed between the rim of said cup-shape and said body.

7. The valve assembly defined in claim 1, wherein said switch means is mounted on a circuit board; and, said circuit board and said motor means are attached to said housing thereby forming a sub-assembly for attachment to said body.

8. The valve assembly defined in claim 1, wherein said valve means comprises a rotor having a axial face thereof sealed for rotation on said body.

9. The valve assembly defined in claim 1, wherein said body defines at least three outlets disposed for communicating through ports arranged in circumferentially spaced arrangement.

10. The valve assembly defined in claim 1, wherein said cam is driven by said motor means and said valve member comprises a rotor driven by said cam means.

11. The valve assembly defined in claim 1, wherein said valving chamber is closed by a cover having said cam means journalled thereon.

12. The valve assembly defined in claim 1, wherein said valving chamber is closed by a cover having an aperture therein with said cam means journalled and sealed in said aperture and is in driving engagement with said valve means.

13. The valve assembly defined in claim 1, wherein said valving chamber is closed by a cover; and, said valve body, said valve member and said cover comprise a sub-assembly.

14. A method of making a motorized diverter valve assembly having a body with an inlet and plural outlets comprising:
   (a) disposing a rotatable valve member in a valving chamber in the body communicating with the inlet and outlets and closing said chamber with a cover and journalling a cam for rotation on said cover;
   (b) disposing a plurality of cam actuated switches on a circuit board and disposing the board in a housing;
   (c) disposing a motorized drive for said cam on said housing;
   (d) attaching said housing to said body over said cover and engaging said motorized drive with said cam.

15. The method defined in claim 14, wherein said step of journalling a cam for rotation on said cover includes disposing a rotary seal between said cam and said cover.

16. The method defined in claim 14, wherein steps (b) and (c) comprise forming a sub-assembly.

17. The method defined in claim 14, wherein steps of attaching said housing to said body includes releasably attaching.

* * * * *